Patented Dec. 29, 1931

1,838,171

UNITED STATES PATENT OFFICE

ABRAHAM S. BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

PROCESS OF PREPARING NATURAL BASE EXCHANGE SILICATES AND PRODUCT THEREOF

No Drawing.   Application filed April 11, 1927.   Serial No. 183,000.

This invention relates to a process of improving the water softening qualities of naturally occurring base exchange silicates preferably when in granular form.

This application is a continuation in part of applications Serial Nos. 504,677, and 504,678, filed October 1, 1921, both of which relate to various methods of preparing natural base exchange silicates for water softening purposes.

In applications Serial Nos. 504,677, and 504,678 there are specifically claimed methods of improving the base exchange and water softening properties of glauconite or greensand.

It appears the glauconite or greensand, which is a granular base exchange, naturally occurring silicate, is to a greater or less degree powdered or disintegrated during water softening processes. This powdering or disintegrating results in a very objectionable turbidity of the effluent water in the water softening process.

The glauconite or greensand is treated with a solution of sodium silicate or with a solution of sodium hydroxide which appears effectively to prevent the arising of such turbidity in effluent water during the softening process. The grains of glauconite may be immersed in a solution of sodium or potassium silicate, for example, such a solution as is made by mixing together one volume of 40° Bé. sodium silicate with 9 volumes of water. This treatment may be carried out at, or near, the boiling point. When the reaction between the sodium silicate and the greensand grains is complete, the sodium silicate is drained off, and the greensand preferably washed with water. To the sodium silicate may be added some sodium carbonate, a satisfactory composition of this character being a solution of sodium silicate to which has been added 2% of sodium carbonate. The treatment with sodium silicate is preferably carried on for about an hour.

Before such silicate treatment the greensand or glauconite may be treated with a hot or cold sodium chloride solution. A preferred procedure is to treat the greensand before the silication with a 10% sodium chloride solution in the cold for about 15 hours. This sodium chloride treatment loosens up the finely divided material upon the surface of the grains which causes the turbidity, and also removes the replaceable magnesium, calcium and potassium in the glauconite or greensand.

To assist in the cleansing and to increase the porosity of the greensand or glauconite grains, the material may be treated with a hot or cold dilute solution of a mineral acid. This treatment is preferably carried out before silication; and a treatment with 2% solution of hydrochloric acid for two hours has been found to be satisfactory. After such acid treatment it is best to wash with water to remove the acid and this may be followed by a washing with a solution of common salt containing a little alkaline material, for example, a 10% sodium chloride solution containing $\frac{1}{10}$ of a percent of caustic soda. The greensand is preferably washed in this alkaline sodium chloride solution for about 15 hours.

The greensand or glauconite may also be baked, which baking appears to assist in decreasing the turbidity of the effluent water in the water softening process. Such baking process should be carried out at a temperature preferably between 350° and 400° C. The baking operation is preferably carried out for only about 20 minutes so that no very great physical change takes place in the glauconite grains, dehydration being avoided as much as possible.

In application Serial No. 504,677 there is also described a process of preparing clay for water softening purposes. In such application it is stated that when the natural base exchange material occurs as clay or friable earth it may be desirable or necessary to bake or frit it in order to give it structural characteristics which render it permeable to liquids and resistant to their disintegrating influences. Such clays or friable earths should be formed into grains and fritted by heat in order to adapt them for the passage of the water through a bed. The treatment of material of this nature with the alkali metal silicate solution may be accomplished either before or after the fritting operation.

Clay, especially bentonite clay, as is found near Fall River, South Dakota, in Wyoming, and near Peoria, Illinois, also may be prepared in this fashion so that it will have very satisfactory base exchange properties.

As pointed out above it is very difficult to use clay directly for water softening inasmuch as it tends to disintegrate or powder when treated in a water softening process, to a much greater degree than do the glauconites or greensands. There is also this difficulty, that whereas glauconite or greensand usually has most of its replaceable base in the form of potassium, clay contains substantial portions of its replaceable base in the form of calcium, so that to obtain very satisfactory results it is frequently desirable to regenerate the clay during some stage of the preparation. Some clays of otherwise very satisfactory character contain substantial quantities of calcium carbonate and when these clays are used it is desirable to remove such calcium carbonate.

Up to the present time clay has usually been prepared for water softening processes by baking the same to a high temperature at which the clay will be more or less completely dehydrated. Since the chemically combined water of hydration appears to have a great influence upon the base exchange or water softening qualities of clay, greensand and other base exchange silicates, it is necessary to rehydrate the baked silicate before it can be satisfactorily used for water softening purposes. This rehydration step usually results in a weakening of the physical constitution of the clay, or greensand, and makes it less resistant to the disintegrating action of water and electrolyte solutions in the water softening process.

When clay in granular condition, or as mined, is treated with a solution of certain alkali metal salts, or is heated with these salts, it is possible to harden mechanically the clay and at the same time dispense with part of all of the dehydrating-baking. Such salts are sodium or potassium silicate, borate, phosphate and stannate. At certain times an alkali metal aluminate may also be used.

The clay, preferably bentonite clay, is placed in a hot or cold solution of sodium silicate or sodium borate, sodium silicate being preferred, very excellent results being obtained in many cases where mixtures of the two are used. A preferred treatment of this character comprises placing the dried clay granules, which have been prepared by treating clay in a drier at a temperature near 110° C. for about 5 to 24 hours, in a solution of a sodium silicate made by admixing one volume of 40° Bé. sodium silicate with about 7 to 10 volumes of water. This solution may also contain five to ten percent of sodium borate or/and it may contain a small quantity of sodium phosphate or sodium carbonate. In case the amount of replaceable bases in the clay is rather low it is often possible to add more replaceable sodium to the clay or bentonite molecule by adding an excess of sodium hydroxide or carbonate to the silicate solution. The addition of an excess of sodium hydroxide to the silicate solution is of exceptional advantage when the treatment with silicate is carried out in the cold or with only a slight warming. Of course, a similar result may be obtained by treating the clay successively with solutions of these various sodium compounds in any desired order.

If desired the excess alkali metal silicate may be removed by separation and washing in suitable centrifugal apparatus; or by decantation, or in any other suitable way. In some cases it may be desirable to add to the mixture of sodium silicate and silicated clay, a solution of aluminum sulphate or sodium aluminate to form a sodium aluminum silicate. This precipitated silicate can be subsequently dried, and as a result of this type of treatment a very advantageous result is obtained in having a natural base exchange silicate surrounded by an artificial base exchange silicate, giving a water softening material a very high and excellent base exchange quality.

Before the clay is subjected to the silication treatment, it is very preferably treated with a 10 to 20% solution of sodium chloride between 50 and 100° C. until reaction ceases. The time may vary between 30 minutes to 3 hours. This sodium chloride treatment appears to assist in the removal and dissolution of any calcium or magnesium carbonate which may be present and at the same time replaces any exchangeable calcium or other alkali earth metal in the clay molecule. In one of the preferred treatments before the silication step, the clay or bentonite is baked until the water of constitution just begins to pass off in substantial quantities which occurs in different clays in temperatures between 550 and 750° C. after which treatment the clay will be much more effectively acted upon by the sodium silicate or potassium silicate. In any case before the treatment with the silicate solution, it is usually desirable to dry the clay thoroughly or to bake it slightly.

Very advantageous results are obtained even after the clay is baked for such a length of time and at such a temperature that it is more or less dehydrated. Under such conditions the silica of the sodium silicate appears to enter into combination with the clay molecule and the solution also causes hydration. A solution of sodium silicate will also be of value in hydrating other baked base exchange silicates such as baked greensand.

In some cases it has been found very desirable to cleanse and somewhat increase the porosity of the clay with a dilute solution of a mineral acid, for example a 2% solution of sulphuric or hydrochloric acid, before or after silication or baking.

This invention is not to be confused with processes of treating gelatinized artificial zeolites which have been prepared by fusion and which gradually disintegrate into a gelatinous impervious mass of material when subjected to the action of acid waters. This invention is directed to the treatment of natural base exchange silicates to increase their hardness and porosity so that they will not tend to disintegrate further upon treatment with water. It is not a process of giving base exchange properties to gelatinous material which does not have such properties, but it is rather a process of substantially increasing the physical resistivity and chemical reactivity of a natural base exchange silicate. These natural silicates do not gelatinize upon treatment with acid waters either in natural or prepared condition.

Nor is this process to be confused with those processes which form a coating of an artificial sodium aluminum silicate over the granules of a naturally occurring base exchange silicate. This process is for the purpose of preserving and increasing the natural base exchange capacity of base exchange silicates, and is not for the purpose of using such materials as carriers for artificial base exchange silicates. Natural base exchange silicates as occurring in nature, often have, or can be treated so that they will have, very desirable porous structure, and this treatment is designed to maintain such desirable porosity as much as possible, and at the same time preserve the base exchange qualities of the naturally occurring silicate.

What is claimed is:

1. A process of improving the base exchange properties of clay which comprises reacting heat-treated granules of natural zeolitic clay with sodium silicate.

2. A process of preparing a base exchange material for water softening purposes which comprises providing a natural zeolitic clay in granular form, treating the same with a solution of a neutral electrolyte and then soaking it in a sodium silicate solution, removing the excess silicate and then washing to remove the uncombined silicate from the granules.

3. A process of preparing a material for water softening purposes which comprises providing the silicate in granular form, treating the granular silicate with a solution of a neutral salt and then soaking the silicate in a sodium silicate solution.

4. A process of preparing clay for water softening purposes which comprises partially baking the clay and silicating it with a solution of sodium silicate.

5. A process of preparing clay for water softening purposes which comprises treating the clay with a neutral salt solution, fritting the clay and treating it with a sodium silicate solution.

6. A process of rehydrating baked clay which comprises subjecting it to treatment with aqueous sodium silicate.

7. A process of preparing a base exchange material for industrial use which comprises treating a natural zeolitic clay with a solution containing an alkali metal silicate and an alkali metal hydroxide.

8. A process of improving the base exchange capacity of natural zeolitic materials which comprises heat-treating the natural zeolitic material and then boiling it in a dilute alkali metal silicate solution.

9. A process of improving the base exchange capacity of natural zeolitic materials which comprises heat-treating the natural zeolitic material until all the uncombined water is removed and then subjecting it to treatment with an alkali metal silicate.

10. A process of improving the base exchange capacity of zeolitic materials which comprises cleansing them with dilute mineral acid solutions and then treating them with dilute sodium silicate.

11. A process of improving the base exchange capacity of natural zeolitic materials which comprises treating the material with sodium borate.

12. A process of improving the base exchange capacity of natural zeolitic materials which comprises treating the material with solutions of an alkali metal silicate, an alkali metal borate, an alkali metal hydroxide, an alkali metal carbonate, and an alkali metal phosphate.

13. A process of improving the base exchange capacity of natural zeolitic materials which comprises treating the natural zeolitic material with solutions of an alkali metal silicate, an alkali metal hydroxide and an alkali metal carbonate.

14. A process of improving the base exchange capacity of zeolitic materials which comprises treating the natural zeolitic material with an alkali metal hydroxide, an alkali metal carbonate and an alkali metal silicate.

In testimony whereof I have hereunto subscribed my name.

ABRAHAM S. BEHRMAN.